No. 820,298. PATENTED MAY 8, 1906.
G. A. GOULD.
MOLD FOR MANUFACTURING BRICKS AND ARTIFICIAL STONE.
APPLICATION FILED DEC. 4, 1905.
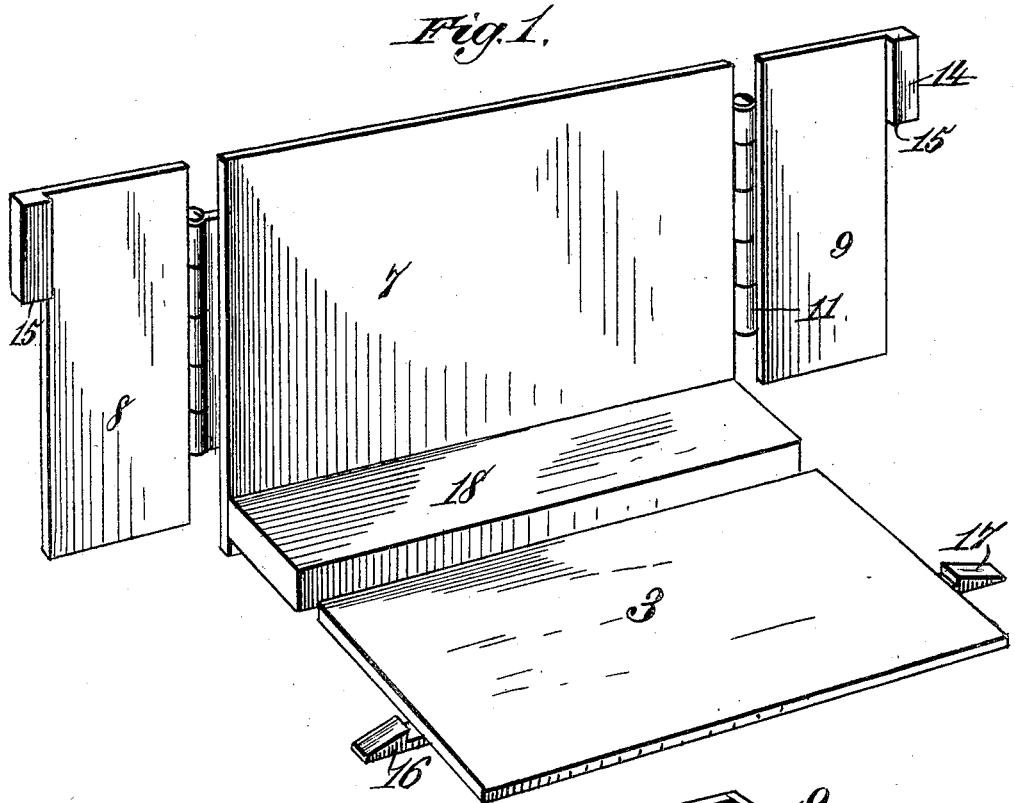
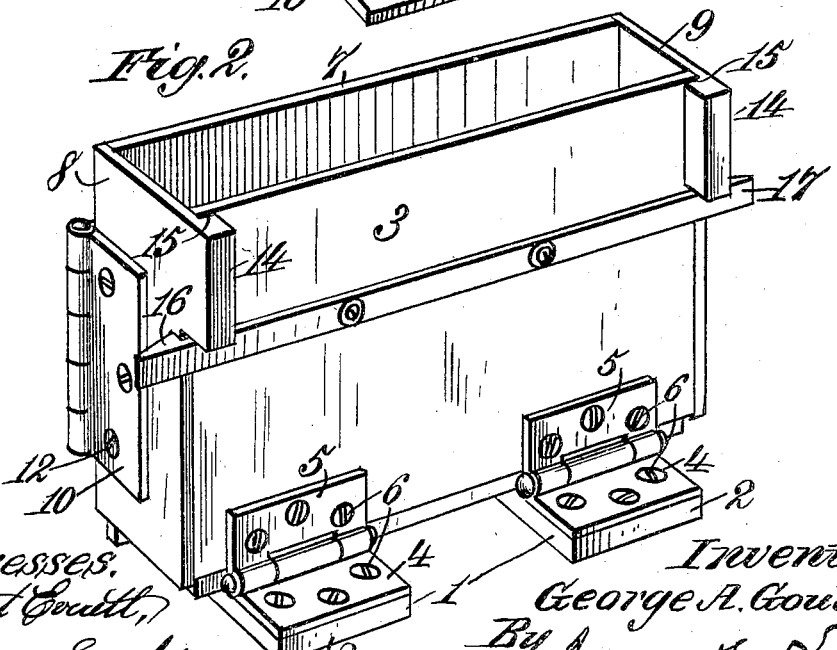
Witnesses.
Robert Gould,
Dennis Sumby.
Inventor:
George A. Gould.
By James L. Norris
Atty.

UNITED STATES PATENT OFFICE.

GEORGE A. GOULD, OF DAVENPORT, IOWA.

MOLD FOR MANUFACTURING BRICKS AND ARTIFICIAL STONE.

No. 820,298.   Specification of Letters Patent.   Patented May 8, 1906.

Application filed December 4, 1905. Serial No. 290,242.

*To all whom it may concern:*

Be it known that I, GEORGE A. GOULD, a citizen of the United States, residing at Davenport, in the county of Scott and State of Iowa, have invented new and useful Improvements in Molds for Manufacturing Bricks and Artificial Stone, of which the following is a specification.

This invention relates to a new and useful mold for the construction of bricks, artificial stone, blocks, and the like from clay, cement, or other suitable material; and the object thereof is to provide a mold in a manner hereinafter set forth which will permit of great pressure upon the material employed during the formation of the brick, stone, or block without distorting the mold and, furthermore, will enable a very convenient and quick operation to be had during the act of molding.

The invention further aims to provide a mold for the purpose set forth which shall be simple in its construction, having the elements thereof suitably interlocked in an automatic manner when closing the mold, readily and quickly opened, so that the molded article can be conveniently removed, strong, durable, efficient in its use, and comparatively inexpensive to manufacture.

With the foregoing and other objects in view the invention consists of the novel construction, combination, and arrangement of parts hereinafter more specifically described, and illustrated in the accompanying drawings, which form a part of this specification and wherein is shown the preferred embodiment of the invention; but it is to be understood that changes, variations, and modifications can be resorted to which come within the scope of the claims hereunto appended.

In describing the invention in detail reference is had to the accompanying drawings, wherein like reference characters denote corresponding parts throughout both views, and in which—

Figure 1 is a perspective view of the mold when opened, and Fig. 2 is a like view with the mold closed.

A mold for the purpose set forth in accordance with this invention comprises a base 1, formed, preferably, of two or more sections suitably spaced apart; but, if desired, the base 1 can be formed of a single piece of suitable material. The base 1 is of much greater width than the width of the mold when the latter is set up, and the said base 1 projects forwardly at the bottom of the mold, and the said projecting portion 2 of the base 1 acts as a means for supporting the hinged front wall 3 of the mold and, furthermore, constitutes a means for supporting the lower sections 4 of the hinges which constitute the connection between the base and the front wall 3, the upper section of the hinges being indicated by the reference character 5 and secured to the front face of the wall 3, at the bottom thereof.

The holdfast devices for securing the hinges to the base and the wall 3 are indicated by the reference character 6.

The rear wall of the mold is indicated by the reference character 7, said wall being fixed at its bottom to the base 1.

The side walls of the mold are indicated by the reference characters 8 9 and are hinged to the rear wall 7 in such a manner that the said side walls 8 9 can be swung rearwardly to open position, but when closed the said side walls 8 9 will abut against the side edges of the rear wall 7 and the rear edges of the said side walls 8 and 9 will lie flush with the outer face of the rear wall 7. The connection between the side walls 8 9 and the rear wall 7 is had through the medium of a pair of hinges and which are adapted to suspend the side walls 8 9.

The sections of the hinges for connecting as well as suspending the side walls 8 9 to and from the rear wall 7 are indicated by the reference characters 10 11, said sections 10 being secured by the holdfast devices 12 to the rear wall 7, and the said sections 10 project laterally from the side edges of the rear wall 7, thereby suspending the side walls 8 9 when the latter are opened a suitable distance from the side edges of the rear wall 7. By sucn an arrangement it permits the side walls 8 9 when swung to closure position to abut against the side edges of the rear wall 7 and make a substantially tight joint. The sections 11 of the hinges which connect the side walls 8 9 to the rear wall 7 are secured to the side walls 8 9 through the medium of the holdfast devices 13. Each of the side walls 8 9 at its upper outer corner is provided with a forwardly-extending protuberance 14 of greater width than the width of its respective side wall, thereby forming a longitudinally-extending shoulder 15, which when the mold is closed lies in the path of the front wall 3, so as to prevent said front wall 3 from being opened until the side walls 8 9 are released from closure position. A lock, to be hereinafter referred to, for retaining said side walls in closure position is employed.

The lock for retaining the side walls 8 9 in closure position consists of a pair of shouldered spring-catches 16 17, which are secured to the outer face of the front wall 3 below the protuberances 14, and the said spring-catches 16 17 project laterally from said front wall 3, and when said wall 3 is moved to closure position said spring-catches 16 17 are adapted to engage the side walls 8 9, so as to prevent the said side walls 8 9 from being moved from closure position until the said spring-catches 16 17 are moved out of the path of the said side walls 8 9.

By providing the side walls 8 9 with the protuberances 14, so as to form the shoulder 15, and by securing to the front wall the shouldered spring-catches 16 17 the side walls 8 9 and front wall 3 are adapted to interlock one with the other when the mold is closed, the interlocking being what may be termed in an "automatic" manner, for the reason that the protuberances 14 position themselves in the path of the front wall 3 when the side walls are swung to closure position, and as the spring-catches are beveled the said side walls will ride over the beveled faces of the catches, so that after they pass said beveled portion the catches will spring to locking position—that is to say, the shoulders of the spring-catches will be positioned against the outer face of the side walls 8 9.

The mold is provided with a removable pallet (indicated by the reference character 18) which constitutes a removable base-plate.

The manner of using the mold is as follows: The pallet 18 of a proper size is placed in the bottom of the mold and the side walls and front wall folded together until the spring-catches spring to locking position, said spring-catches, in connection with the shouldered protuberances, locking the mold. The mold is then filled level with the necessary material. The mold and the contents thereof are then placed under the plunger of a machine which is forced down into the mold, so that the contents thereof are pressed into the form and size of the brick, stone, or block required. The spring-catches are then released, which admits of the sides and front wall of the mold being swung away from the brick, stone, or block. The latter can then be removed by means of the pallet which supports it. The pallet also facilitates the handling of the bricks, stone, or blocks after their removal from the mold.

The walls of the mold are preferably constructed of metal, so that the inner faces of the walls will be very smooth, which imparts a similar surface to the molded article, yet the walls of the mold can be constructed of any suitable material. The pallet is preferably formed of wood; but any other suitable material can be employed.

Having thus fully described my invention, what I claim as new, and desire to secure by Letters Patent, is—

1. A mold consisting of a base of greater width than the mold proper and projecting forwardly from the mold, a front wall hinged to the projecting portion of the base, a rear wall fixed to the base, a pair of side walls hinged to said fixed wall, each of said side walls having the front thereof at its top provided with a forwardly-projecting protuberance having an inwardly-extending shoulder adapted when the mold is closed to be positioned in the path of the front wall, and spring-catches carried by the front wall and adapted to engage the side walls below the protuberances for automatically locking said side and front walls in position, said shouldered protuberances and spring-catches constituting a lock for retaining the mold in its closed position.

2. A mold consisting of a base of greater width than the mold proper and projecting forwardly from the mold, a front wall hinged to the projecting portion of the base, a rear wall fixed to the base, a pair of side walls hinged to said fixed wall, each of said side walls having the front thereof at the top provided with a forwardly-projecting protuberance having an inwardly-extending shoulder adapted when the mold is closed to be positioned in the path of the front wall, and spring-catches carried by the front wall and adapted to engage the side walls below the protuberances for automatically locking said side and front walls in position, said shouldered protuberances and spring-catches constituting a lock for retaining the mold in its closed position, combined with a removable pallet supported upon the base of the mold.

3. A mold comprising a base, a front wall hinged thereto, a rear wall fixed to the base, a pair of side walls, means for hinging and suspending the side walls a suitable distance from the rear wall so that when said side walls are moved to closure position, the inner face of the side walls will abut against the side edges of the rear wall, and means carried by the side walls and the front wall for automatically locking the walls of the mold together when the mold is closed.

4. A mold comprising a base, a front wall, means secured to the base and to the front wall for hinging said front wall to the base, spring-catches secured to the front wall, a rear wall fixed to the base, a pair of side walls provided at the top with forwardly-extending shouldered protuberances, and means secured to the rear wall, projecting laterally therefrom and secured to the side walls for hinging and suspending the side walls to and from said rear wall, said shouldered protuberances adapted to engage the front wall and said spring-catches adapted to engage the side walls below said protuberances when the mold is closed, thereby constituting a lock for retaining the mold in position when closed.

5. A mold comprising a base, a front wall hinged thereto, a rear wall fixed to the base, a pair of side walls, means for hinging and suspending the side walls a suitable distance from the rear wall so that when said side walls are moved to closure position, the inner face of the side walls will abut against the side edges of the rear wall, and means carried by the side walls and the front wall for automatically locking the walls of the mold together when the mold is closed, combined with a removable pallet mounted upon the base of the mold.

6. A mold comprising a base, a front wall, means secured to the base and to the front wall for hinging said front wall to the base, spring-catches secured to the front wall, a rear wall fixed to the base, a pair of side walls provided at the top thereof with forwardly-extending shouldered protuberances, and means secured to the rear wall, projecting laterally therefrom and secured to the side walls for hinging and suspending said side walls to and from said rear wall, said shouldered protuberances adapted to engage the front wall and said spring-catches adapted to engage the side walls below the protuberances when the mold is closed, thereby constituting a lock for retaining the mold in position when closed, combined with a removable pallet supported upon the base of the mold.

In testimony whereof I have hereunto set my hand in presence of two subscribing witnesses.

GEORGE A. GOULD.

Witnesses:
   LOUIS BLOCK,
   KATIE MAHON.